United States Patent
Zhu et al.

(10) Patent No.: US 10,547,056 B2
(45) Date of Patent: Jan. 28, 2020

(54) PRECURSORS FOR LITHIUM TRANSITION METAL OXIDE CATHODE MATERIALS FOR RECHARGEABLE BATTERIES

(71) Applicants: Umicore, Brussels (BE); Umicore Korea Ltd., Chungnam (KR)

(72) Inventors: Liang Zhu, Cheonan (KR); Randy De Palma, Kessel-Lo (BE); Hyo Sun Ahn, Cheonan (KR); Sung Jun Cho, SuWon (KR); Daniël Nelis, Peer (BE); Kris Driesen, Hasselt (BE)

(73) Assignees: UMICORE, Brussels (BE); UMICORE KOREA, LTD., Cheonan, Chungnam (KR)

( * ) Notice: Subject to any disclaimer, the term of this patent is extended or adjusted under 35 U.S.C. 154(b) by 0 days.

(21) Appl. No.: 15/763,141

(22) PCT Filed: Sep. 23, 2016

(86) PCT No.: PCT/IB2016/055690
§ 371 (c)(1),
(2) Date: Mar. 26, 2018

(87) PCT Pub. No.: WO2017/055977
PCT Pub. Date: Apr. 6, 2017

(65) Prior Publication Data
US 2018/0269477 A1    Sep. 20, 2018

(30) Foreign Application Priority Data
Sep. 30, 2015   (EP) ..................................... 15187642

(51) Int. Cl.
*H01B 1/08*     (2006.01)
*H01M 4/525*   (2010.01)
(Continued)

(52) U.S. Cl.
CPC .......... *H01M 4/525* (2013.01); *C01G 53/006* (2013.01); *C01G 53/40* (2013.01); *C01G 53/44* (2013.01);
(Continued)

(58) Field of Classification Search
CPC .. H01M 4/525; H01M 4/505; H01M 10/0525; H01M 2004/028; C01G 53/006;
(Continued)

(56) References Cited

U.S. PATENT DOCUMENTS 8,268,198 B2    9/2012   Shin et al.
8,609,068 B2   12/2013   Hagar et al.
(Continued)

FOREIGN PATENT DOCUMENTS

CN    1685541 A      10/2005
JP    2006172753 A    6/2006
(Continued)

OTHER PUBLICATIONS

EPO, Search Report for European Patent Application No. 15187642, dated Mar. 11, 2016.
(Continued)

*Primary Examiner* — Harold Pyon
*Assistant Examiner* — Jaison P Thomas
(74) *Attorney, Agent, or Firm* — NK Patent Law

(57) ABSTRACT

A particulate precursor compound for manufacturing a lithium transition metal (M)-oxide powder for use as an active positive electrode material in lithium-ion batteries, wherein (M) is $Ni_xMn_yCo_zA_v$, A being a dopant, wherein $0.33 \leq x \leq 0.60$, $0.20 \leq y \leq 0.33$, and $0.20 \leq z \leq 0.33$, $v \leq 0.05$, and $x+y+z+v=1$, the precursor comprising Ni, Mn and Co in a molar ratio x:y:z and having a specific surface area BET in $m^2/g$ and a sulfur content S expressed in wt %, wherein formula (I).

3 Claims, 3 Drawing Sheets

(51) Int. Cl.
*H01M 4/505* (2010.01)
*H01M 10/0525* (2010.01)
*C01G 53/00* (2006.01)
*H01M 4/02* (2006.01)

(52) U.S. Cl.
CPC ............... *C01G 53/50* (2013.01); *H01B 1/08* (2013.01); *H01M 4/505* (2013.01); *H01M 10/0525* (2013.01); *C01P 2002/52* (2013.01); *C01P 2002/54* (2013.01); *C01P 2004/51* (2013.01); *C01P 2006/12* (2013.01); *C01P 2006/40* (2013.01); *C01P 2006/80* (2013.01); *H01M 2004/028* (2013.01)

(58) Field of Classification Search
CPC ........ C01G 53/40; C01G 53/44; C01G 53/50; C01P 2002/52; C01P 2006/00; C01P 2002/54; C01P 2006/40; C01P 2006/12; C01P 2006/80; C01P 2004/51; Y02E 60/122; Y02P 70/54; H01B 1/08
USPC ........................................................ 252/500
See application file for complete search history.

(56) References Cited

U.S. PATENT DOCUMENTS

| 2002/0053663 A1 | 5/2002 | Ito et al. |
| 2005/0221179 A1 | 10/2005 | Peter et al. |
| 2012/0231343 A1 | 9/2012 | Nagase et al. |
| 2012/0241666 A1 | 9/2012 | Hong et al. |
| 2012/0258366 A1* | 10/2012 | Yu .......................... H01M 4/525 429/223 |
| 2014/0175329 A1 | 6/2014 | De Palma et al. |

FOREIGN PATENT DOCUMENTS

| JP | 2007070205 A | | 3/2007 |
| JP | 2010192424 A | | 9/2010 |
| JP | 2011518102 A | | 6/2011 |
| JP | 2013235786 A | * | 11/2013 |
| JP | 2013235786 A | | 11/2013 |
| TW | 201431794 A | | 8/2014 |
| WO | WO2015033246 A2 | | 11/2013 |
| WO | 2014098238 A1 | | 6/2014 |
| WO | 2015008863 A1 | | 1/2015 |
| WO | 2015033246 A2 | | 3/2015 |
| WO | WO2015189737 A1 | | 12/2015 |

OTHER PUBLICATIONS

TIPO, Search Report for Taiwanese Patent Application No. 105131379, dated Mar. 28, 2017.
International Search Report for PCT/IB2016/055690, dated Jan. 13, 2017.
Lu, Z., et al., "Layered Li[NixCo1-2xMnx]O2 Cathode Materials for Lithium-Ion Batteries", Electrochemical and Solid-State Letters, vol. 4, No. 12 (2001), pp. A200-A203.
EPO; Extended European Search Report for European Patent Application No. 16850476.9 dated Apr. 17, 2019, 7 pages.

* cited by examiner

PRECURSORS FOR LITHIUM TRANSITION METAL OXIDE CATHODE MATERIALS FOR RECHARGEABLE BATTERIES

This application is a National Stage application of International Application No. PCT/IB2016/055690, filed Sep. 23, 2016. This application also claims priority to European Application No. EP15187642.2, filed Sep. 30, 2015.

TECHNICAL FIELD AND BACKGROUND

The invention is related to precursors for lithium transition metal oxides for use in a rechargeable battery that have a unique combination of characteristics to provide excellent battery materials for demanding technologies such as automotive applications. More in particular, the precursors may be hydroxide or oxyhydroxide compounds having physical and chemical characteristics such as sulfur content and specific surface area that are related by a mathematical formula to the Ni content of the precursor.

Due to their high energy density, rechargeable lithium and lithium-ion batteries can be used in a variety of portable electronics applications, such as cellular phones, laptop computers, digital cameras and video cameras. Commercially available lithium-ion batteries typically consist of graphite-based anode and $LiCoO_2$-based cathode materials. However, $LiCoO_2$-based cathode materials are expensive and typically have a relatively low capacity of approximately 150 mAh/g.

Alternatives to $LiCoO_2$-based cathode materials include LNMCO type cathode materials. LNMCO means lithium-nickel-manganese-cobalt-oxides. The composition is $LiMO_2$ or $Li_{1+x}M_{1-x}O_2$ where $M=Ni_xCo_yMn_zA_m$ (which is more generally referred to as "NMC", A being one or more dopants). LNMCO has a similar layered crystal structure as $LiCoO_2$ (space group r-3m). The advantage of LNMCO cathodes is the much lower raw material price of the composition M versus pure Co. The addition of Ni gives an increase in discharge capacity, but is limited by a decreasing thermal stability with increasing Ni content. In order to compensate for this problem, Mn is added as a structural stabilizing element, but at the same time some capacity is lost. Typical cathode materials include compositions having a formula $Li_{1+x}(Ni_{0.51}Mn_{0.29}Co_{0.20})_{1-x}O_2$ (for example x=0.00-0.03, referred to as NMC532), $Li_{1+x}(Ni_{0.38}Mn_{0.29}Co_{0.33})_{1-x}O_2$ (for example x=0.08-0.10, referred to as NMC433), $Li_{1+x}(Ni_{0.6}Mn_{0.2}Co_{0.2})_{1-x}O_2$ (x=0.02-0.04, referred to as NMC622) or $Li_{1+x}(Ni_{0.35}Mn_{0.32}Co_{0.33})_{1-x}O_2$ (for example x=0.06-0.08, referred to as NMC111).

The target lithium-containing composite oxide is generally synthesized by mixing a nickel-cobalt-manganese composite (oxy-)hydroxide as a precursor material (having the same metal composition as the final cathode material will have) with a lithium compound and firing, and the cell characteristics can be improved by substituting a part of nickel, cobalt and manganese by other metal elements. As other metal elements Al, Mg, Zr, Ti, Sn and Fe are exemplified. The suitable substituting quantity is 0.1 to 10% of the total quantity of the nickel, cobalt and manganese atoms.

Generally, for the production of cathode materials with complex compositions, special precursors such as mixed transition metal hydroxides are used. The reason is that high performance $Li-M-O_2$ needs well mixed transition metal cations. To achieve this without "oversintering" (high temperature sintering for a longer period together with a lithium precursor, typically $Li_2CO_3$ or LiOH) the cathode precursors need to contain the transition metal in a well-mixed form (at atomic level) as provided in mixed transition metal hydroxides, carbonates etc. Mixed hydroxides or carbonates are typically prepared by precipitation reactions. Precipitation of mixed hydroxides (for example, the precipitation of a flow of NaOH with a flow of $M-SO_4$ under controlled pH) or mixed carbonates (for example, the precipitation of a flow of $Na_2CO_3$ with a flow of $M-SO_4$) allows precursors of suitable morphology to be achieved. The precipitation typically takes place in a continuous stirred tank reactor (a CSTR reactor).

For characterizing a secondary lithium cell one of the most important parameters besides the discharge capacity is the irreversible capacity, which is responsible for the fading of the capacity during cycling. Lithium-excess layered transition metal oxides $Li_{1+x}M_{1-x}O_2$ often have a huge irreversible capacity loss associated with the oxygen and lithium loss from the host structure of the layered oxide at the end of the first charging process. Although the irreversible capacity loss can be significantly reduced by coating with insulating materials (e.g., $Al_2O_3$ or MgO), the high surface area associated with the nanostructured lithium layered oxides could have such a high surface reactivity to induce side reactions between the electrodes and the electrolyte. This could lead to destabilization of the active materials and an increase in impeding passivation. Therefore, the electrolyte safety is of major concern, and ways have to be found to eliminate the side reactions and lower the irreversible capacity $Q_{irr}$. As described by Lu and Dahn in "Layered $Li[Ni_xCo_{1-2x}Mn_x]O_2$ Cathode Materials for Lithium-Ion Batteries", *Electrochemical and Solid-State Letters*, 4 (12) A200-A203 (2001), for x=¼ and ⅜, when cycling between 2.5 and 4.4 V at a current of 40 mA/g, an irreversible capacity loss of 12% is quite acceptable. In the present invention however, the author achieve even better results. In patents such as U.S. Pat. No. 8,268,198 the relationship between the chemical composition of the precursor compound (i.e. the sulfate content) and the irreversible capacity of the lithium transition metal oxide cathode material has been established. A direct relationship between the physical characteristics of the precursor and the irreversible capacity of the lithium transition metal oxide cathode material, wherein also the Ni content of the material is taken into account, has not yet been provided.

It is expected that in the future the lithium battery market will be increasingly dominated by automotive applications. Automotive applications require very large batteries that are expensive, and must be produced at the lowest possible cost. A significant fraction of the cost comes from the cathodes, i.e. the positive electrodes. Providing these electrodes by a cheap process can help to lower cost and boost market acceptance. Automotive batteries also need to last for many years. During this time batteries do not always operate. A long battery life is related to two properties: (a) small loss of capacity during storage and (b) high cycle stability.

The automotive market includes different major applications. Batteries for EV (electric vehicles) need to store energy for several hundreds of km of driving range. Thus the cells are very large. Obviously the required discharge rates do not exceed a full discharge within hours. Thus sufficient power density is easily achieved and no special concern is paid to dramatically improve the power performance of the battery. Cathode materials in such batteries need to have a high capacity and a good calendar life.

Contrary to this, (P)HEV ((plug-in) hybrid electric vehicles) have much higher specific power requirements. Electrically assisted accelerations and regenerative braking require that the batteries are discharged or recharged within a couple of seconds. At such high rates the so-called Direct Current Resistance becomes important. DCR is measured by suitable pulse tests of the battery. The measurement of DCR is for example described in "Appendix G, H, I and J of the USABC Electric Vehicle Battery Test Procedures" which can be found at http://www.uscar.org. USABC stands for "US advanced battery consortium" and USCAR stands for "United States Council for Automotive Research"

If the DCR resistance is small, then the charge-discharge cycle is highly efficient; and only a small amount of ohmic heat evolves. To achieve these high power requirements the batteries contain cells with thin electrodes. This allows that (1) Li diffuses over only short distances and (2) current densities (per electrode area) are small, contributing to high power and low DCR resistance. Such high power batteries put severe requirements on the cathode materials: they must be able to sustain very high discharge or charge rates by contributing as little as possible to the overall battery DCR. In the past, it has been a problem to improve the DCR resistance of cathodes. Furthermore, it was a problem to limit the increase of DCR during the long term operation of the battery.

The present invention aims to provide improved precursors of lithium transition metal cathode materials for positive electrodes having an intermediate to high Ni content, made by a cheap process, having a reduced irreversible capacity $Q_{irr}$ upon cycling in the secondary battery, and having an improved DCR resistance.

SUMMARY

Viewed from a first aspect, the invention can provide the following precursor embodiments:

Embodiment 1

A particulate precursor compound for manufacturing a lithium transition metal (M)-oxide powder for use as an active positive electrode material in lithium-ion batteries, wherein (M) is $Ni_xMn_yCo_zA_v$, A being a dopant, wherein $0.33 \leq x \leq 0.60$, $0.20 \leq y \leq 0.33$, and $0.20 \leq z \leq 0.33$, $v \leq 0.05$, and $x+y+z+v=1$, the precursor comprising Ni, Mn and Co in a molar ratio x:y:z and having a specific surface area BET in $m^2/g$ and a sulfur content S expressed in wt %, wherein $$\left(\frac{BET-25}{18-6x}\right)^2 + \left(\frac{S-0.15}{0.25-0.05x}\right)^2 \leq 1.$$

Embodiment 2 the precursor has a specific surface area with $12 < BET < 50$ $m^2/g$.

Embodiments 3 and 4 the precursor according to either embodiment 1 or 2, wherein $$\left(\frac{BET-25}{18-6x}\right)^2 + \left(\frac{S-0.15}{0.25-0.05x}\right)^2 \leq 0.9.$$

Embodiment 5 and 6 the precursor according to either embodiment 1 or 2, wherein $x \leq 0.50$ and $$\left(\frac{BET-25}{18-6x}\right)^2 + \left(\frac{S-0.15}{0.25-0.05x}\right)^2 \leq 0.75.$$

Embodiment 7 the particulate precursor compound may be a hydroxide M-OH or an oxyhydroxide M-OOH compound. The dopant A can be one or more elements from the group of Al, Mg, Zr, W, Ti, Cr and V. These are dopants with advantages that are known from the prior art.

Each of the individual precursor embodiments described hereabove can be combined with one or more of the embodiments described before it.

Viewed from a second aspect, the invention can provide in Embodiment 8 the use of the precursor compound in the manufacturing of a lithium transition metal (M)-oxide powder for an active positive electrode material of a lithium-ion battery for hybrid electric vehicles, wherein the precursor has a median particle size with 3 µm$<=$D50$<=$6 µm.

Viewed from a third aspect, the invention can provide the following method embodiments for preparing the particulate precursor compound of the first aspect of the invention:

Embodiment 9

A method for preparing the particulate precursor compound of the invention, comprising the steps of:
  providing a loop reactor having a loop reaction zone comprising a stream of liquid medium and a means to deliver power to the stream of liquid medium,
  feeding an M-SO$_4$ flow and a flow of either NaOH or Na$_2$CO$_3$ into distinct portions of the loop reaction zone, whereby at least a portion of the M-SO$_4$ and either the NaOH or Na$_2$CO$_3$ react to form the particulate precursor in the stream of liquid medium,
  continuously (re-)circulating the liquid medium through the loop reaction zone; and,
  discharging from the loop reaction zone a portion of the liquid medium comprising the precipitated precursor, whereby the power delivered to the stream of liquid medium by said means is between 1 and 25 W/kg, and preferably between 2 and 15 W/kg. The power is preferably delivered to a rotating impeller inside the loop reactor by an engine having a given engine frequency drive. Instead of NaOH or Na$_2$CO$_3$ another base can be used, such as NaHCO$_3$ or NH$_4$HCO$_3$.

Embodiment 10

The method wherein the loop reactor has an average residence time between 5 and 90 minutes.

Embodiment 11

The method wherein the temperature in the loop reactor is between 45-200° C., and preferably between 120 and 170° C.

Each of the individual method embodiments described hereabove can be combined with one or more of the method embodiments described before it.

Viewed from a fourth aspect the invention can provide a method for preparing a lithium transition metal (M)-oxide powder for use as an active positive electrode material in lithium-ion batteries, comprising the steps of:

providing the M-precursor according to the invention,
providing a Li precursor compound,
mixing the M-precursor and the Li precursor, and
firing the mixture at a temperature between 600 and 1100° C. for at least 1 hr. The source of dopant A may be provided in the M- and/or the Li precursor, the M- and/or the Li precursors being doped with A. It may also be that the dopant A is provided in a separate A-precursor that is mixed with the M-precursor and the Li precursor before firing.

DETAILED DESCRIPTION

Figure 1:
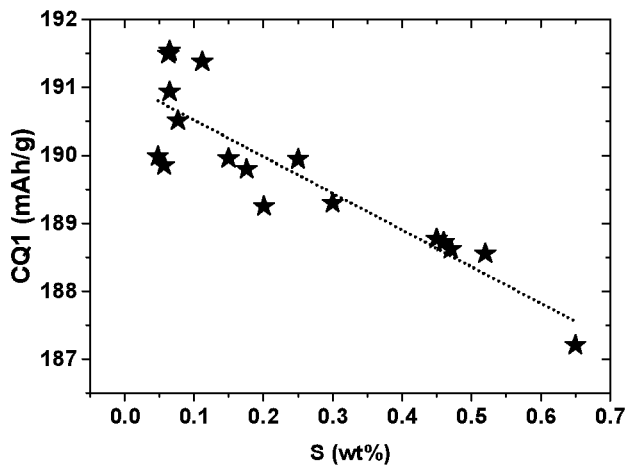
FIG. 1: the correlation between the initial charge capacity of NMC532 and the sulfur content of the corresponding precursor, where the dotted line is a linear interpretation.

The precursors according to the invention are typically mixed hydroxides or carbonates prepared by precipitation reactions. Precipitation of mixed hydroxides (for example, the precipitation of a flow of NaOH with a flow of $M-SO_4$ under controlled pH) or mixed carbonates (for example, the precipitation of a flow of $Na_2CO_3$ with a flow of $M-SO_4$) allows precursors of suitable morphology to be achieved. The precipitation reaction can take place in a continuous flow or loop reactor (also referred to as CFR reactor) as illustrated in U.S. Pat. No. 8,609,068. In the reactor the following actions take place:

a) continuously feeding an $M-SO_4$ flow and a flow of a base like NaOH or $Na_2CO_3$ into distinct portions of a loop reaction zone comprising a stream of liquid medium, with the optional addition of ammonia (as chelating agent) to achieve a desired morphology; wherein at least a portion of the $M-SO_4$ and the NaOH or $Na_2CO_3$ react to form the precursor in the liquid medium of the loop reaction zone;

b) continuously recirculating the liquid medium through the loop reaction zone (typically by the energy delivered by an impeller);

c) continuously discharging from the loop reaction zone a portion of the liquid medium comprising the precipitated precursor;

d) filtering and washing the precipitated precursor until a conductivity of less than 50 μS is reached in the washing water; and e) drying the precipitate at a temperature of between 70-150° C. for 12 to 30 hours.

Such a reactor allows to carefully control the physical properties of the precursor—i.e. the BET and sulfur content—by modifying the temperature, the energy input in the loop reactor, and the addition rate of the liquid carrying the reactants (being equal to the discharge rate of the liquid carrying the reagents) which defines the number of passes of the liquid medium through the continuous loop reactor, and which corresponding to the residence time. By residence time is understood the average residence time in the reactor volume calculated from the volume of the reactor divided by the addition rate e.g.

$$\frac{1L}{\frac{3L}{\text{hour}}}.$$

Practically, when operated by a skilled person the particle size and other product characteristics can be changed by selecting certain values for the pH, the residence time and the energy input to the liquid medium. In such a loop setup a high power input per kg of treated material can be applied, and all material passes the impeller frequently. When the residence time is lowered a higher BET value is obtained. The pH is influenced by the ammonia content and the (molar) ratio of NaOH used per metal M in the precipitation, and has an effect on the sulfur content and BET. When the pH is lowered, a higher sulfur content and a higher BET is reached.

In this invention, precursor compound material needs to have both a value for BET and S % falling in a specific range, to ensure that the resulting cathode material has low $Q_{irr}$ and low DCR. For a particulate precursor compound at a given D50 with Gaussian particle size distribution, a low BET means dense spherical precursor particles which normally lead to a dense cathode material after reaction with a lithium precursor. A high BET means that the precursor contains a certain amount of porosity, which results in porous cathode materials after lithiation. A certain amount of porosity could allow sufficient contact between cathode particles and electrolyte, which shortens the diffusion path of Li ion diffusion, hence a lower DCR at especially low state of charge where Li ion diffusion becomes more difficult. However, a too high BET precursor could lead to too many pores in the cathode material after lithiation. On the one hand, this will reduce the cathode density. On the other hand, too many particle cracking and breaking will occur during electrode calendaring, requiring more electrolyte for cathode wetting, leading to more SEI formation and probably creating a problem of low Li ion diffusion.

When using metal sulfate as source material for the metal hydroxide precursor precipitation, a certain amount of sulfate normally remains as an impurity—although it could be very low, or even zero. This sulfate will transform into lithium sulfate after reaction with the lithium source, and stay on the particle surface of the cathode material. Too much lithium sulfate will of course cause a loss of charge capacity, which is not preferred. However, a certain amount of lithium sulfate covering the particle surface could prevent the particle grain boundaries from cracking during lithium extraction and insertion, which is especially beneficial for high Ni NMC cathode material. For a precursor compound with a certain BET, a little lithium sulfate could also help to reduce the $Q_{irr}$ of the resultant cathode material. A dissolution of lithium sulfate could reduce the impedance between the electrolyte and cathode particle, hence resulting in a lower DCR.

Precursors with small particle size (such as 4-6 μm) will result in cathode powders with small particle size and are used for high rate applications, such as in hybrid electric vehicles. For these it is important to have a low $Q_{irr}$, such as less than 9%. Precursor with larger particle size (such as 10-12 μm) will result in cathode powders with larger particle size and are used for high capacity applications, such as in pure electric vehicles. For these a somewhat higher $Q_{irr}$, such as less than 10%, is acceptable.

A DCR test of the final lithiated cathode materials does not yield a single value, but its value is a function of the battery's state of charge (SOC). For LNMCO cathodes, the DCR increases at low state of charge whereas it is flat or shows a minimum value at a high state of charge. A high state of charge refers to a charged battery, a low state of charge is discharged. The DCR strongly depends on temperature. Especially at low temperature the cathode contribution to the DCR of the cell becomes dominant, hence low T measurements are quite selective to observe improvements of DCR that are directly attributable to the behaviour of the cathode materials. In the examples, DCR results of cathodes of real full cells using materials according to the invention are reported. Typically the SOC is varied from 20 to 90%, and the tests are performed at representative temperatures of 25° C. and −10° C.

GENERAL DESCRIPTION OF EXPERIMENTAL DATA a) PBET Precursor Specific Surface Area The specific surface area is measured with the Brunauer-Emmett-Teller (BET) method using a Micromeritics Tristar 3000. 2 g of precursor powder sample is first dried in an oven at 120° C. for 2 hr, followed by $N_2$ purging. Then the precursor is degassed in vacuum at 120° C. for 1 hr prior to the measurement, in order to remove adsorbed species. A higher drying temperature is not recommended in precursor BET measurements, since a precursor may oxidize at relatively high temperature, which could result in cracks or nano-sized holes, leading to an unrealistically high BET.

b) S Content of the Precursor after Washing and Drying

The S content is measured with the Inductively Coupled Plasma (ICP) method by using an Agilent ICP 720-ES. 2 g of precursor powder sample is dissolved into 10 mL high purity hydrochloric acid in an Erlenmeyer flask. The flask may be covered by glass and heated on a hot plate for complete dissolution of the precursor. After being cooled to the room temperature, the solution is moved to a 100 mL volumetric flask and the flask is rinsed 3~4 times using distilled (DI) water. Afterwards, the volumetric flask is filled with DI water up to the 100 mL mark, followed by complete homogenization. 5 mL solution is taken out by a 5 mL pipette and transferred into a 50 mL volumetric flask for a $2^{nd}$ dilution, where the volumetric flask is filled with 10% hydrochloric acid up to the 50 mL mark and then homogenized. Finally, this 50 mL solution is used for ICP measurement.

c) Cathode Material Preparation

In this invention, in order to evaluate the electrochemical behaviour in a coin cell, cathode materials have been prepared from the precursor compounds according to the invention, by using conventional high temperature sintering, as is described in e.g. US2014/0175329. $Li_2CO_3$ (Chemetall) or LiOH (SQM) is dry mixed with the precursor compound in a certain Li:M molar ratio using a Henschel Mixer® for 30 mins. The mixture is reacted at a high temperature for 10 hr under air, using pilot-scale equipment. The Li:M molar blending ratio and sintering temperature are standard, but they differ for precursors with different Ni content, which will be specified in each individual example. After firing, the sintered cake is crushed, classified and sieved so as to obtain a non-agglomerated powder with a mean particle size D50 similar to that of the precursor.

d) Evaluation of Electrochemical Properties in Coin Cells

Electrodes are prepared as follows: about 27.27 wt. % of active cathode material, 1.52 wt. % polyvinylidene fluoride polymer (KF polymer L #9305, Kureha America Inc.), 1.52 wt. % conductive carbon black (Super P°, Erachem Comilog Inc.) and 69.70 wt. % N-methyl-2-pyrrolidone (NMP) (from Sigma-Aldrich) are intimately mixed by means of high speed homogenizers. The slurry is then spread in a thin layer (typically 100 micrometer thick) on an aluminum foil by a tape-casting method. After evaporating the NMP solvent at 120° C. for 3 hr, the cast film is processed through two constantly spinning rolls with a 40 micrometer gap. Electrodes are punched from the film using a circular die cutter measuring 14 mm in diameter. The electrodes are then dried overnight at 90° C. The electrodes are subsequently weighed to determine the active material loading. Typically, the electrodes contain 90 wt. % active materials with an active materials loading weight of about 17 mg (~11 mg/cm²). The electrodes are then put in an argon-filled glove box and assembled within a 2325-type coin cell body. The anode is a lithium foil having a thickness of 500 micrometers (origin: Hosen); the separator is a Tonen 20MMS microporous polyethylene film. The coin cell is filled with a 1M solution of $LiPF_6$ dissolved in a mixture of ethylene carbonate and dimethyl carbonate in a 1:2 volume ratio (origin: Techno Semichem Co.).

Each cell is cycled at 25° C. using Toscat-3100 computer-controlled galvanostatic cycling stations (from Toyo) at different rates in the 4.3~3.0V/Li metal window range. The initial charge capacity CQ1 and discharge capacity DQ1 are measured in constant current mode (CC). The irreversible capacity $Q_{irr}$ is expressed in % as:

$$Q_{Irr.} = \frac{(CQ1 - DQ1)}{CQ1} \times 100 \ (\%)$$

e) Slurry Making, Electrode Coating and Fullcell Assembly

A slurry is prepared by mixing 700 g of the doped and coated NMC 433 with NMP, 47.19 g of super P® (conductive carbon black of Timcal) and 393.26 g of 10 wt. % PVDF based binder in NMP solution. The mixture is mixed for 2.5 hr in a planetary mixer. During mixing additional NMP is added. The mixture is transferred to a Disper mixer and mixed for 1.5 hr under further NMP addition. A typical total amount of NMP used is 423.57 g. The final solid content in the slurry is about 65 wt. %. The slurry is transferred to a coating line. Double coated electrodes are prepared. The electrode surface is smooth. The electrode loading is 9.6 mg/cm$^2$. The electrodes are compacted by a roll press to achieve an electrode density of about 2.7 g/cm$^3$. To prepare pouch cell type full cells, these positive electrodes (cathode) are assembled with a negative electrode (anode) which is typically a graphite type carbon, and a porous electrically insulating membrane (separator). The full cell is prepared by the following major steps: (1) electrode slitting, (2) tap attaching (3) electrode drying, (4) jellyroll winding, and (5) packaging.

(1) electrode slitting: after NMP coating the electrode active material might be slit by a slitting machine. The width and length of the electrode are determined according to the battery application.

(2) tap attaching: there are two kinds of taps. Aluminum taps are attached to the positive electrode (cathode), and copper taps are attached to the negative electrode (anode).

(3) electrode drying: the prepared positive electrode (cathode) and negative electrode (anode) are dried at 85° C. to 120° C. for 8 hr in a vacuum oven.

(4) jellyroll winding: after drying the electrode a jellyroll is made using a winding machine. A jellyroll consists of at least a negative electrode (anode) a porous electrically insulating membrane (separator) and a positive electrode (cathode).

(5) packaging: the prepared jellyroll is incorporated in a 360 mAh cell with an aluminum laminate film package, resulting in a pouch cell. Further, the jellyroll is impregnated with the electrolyte. The quantity of electrolyte is calculated in accordance with the porosity and dimensions of the positive electrode and negative electrode, and the porous separator. Finally, the packaged full cell is sealed by a sealing machine.

f) DCR (Direct Current Resistance) Evaluation

The DCR resistance is obtained from the voltage response to current pulses, the procedure used is according to the USABC standard mentioned before. The DCR resistance is very relevant for practical application because data can be used to extrapolate fade rates into the future to prognoses battery life, moreover DCR resistance is very sensitive to detect damage to the electrodes, because reaction products of the reaction between electrolyte and anode or cathode precipitate as low conductive surface layers.

The procedure is as follows: the cells are tested by hybrid pulse power characterization (HPPC) to determine the dynamic power capability over the device's useable voltage range, using a test profile that incorporates 10 sec charge and 10 sec discharge pulses at each 10% stage of charge (SOC) step. In the current invention, the HPPC tests are conducted at both 25° C. and −10° C. The testing procedure of 25° C. HPPC is as follows: a cell is first charged-discharged-charged between 2.7~4.2V under CC/CV (constant current/constant voltage) mode at 1 C rate (corresponding to the current which discharges a charged cell within 1 hr). Afterwards, the cell is discharged under CC mode at 1 C rate to 90% SOC, where 10 second discharge at 6 C rate (corresponding to the current which discharges a charged cell within ⅙ hr) is applied followed by 10 second charge at 4 C rate. The differences in voltage during pulse discharge and pulse charge are used to calculate the discharge and charge direct current resistance (DCR) at 90% SOC. The cell is then discharged at 1 C rate to different SOC's (80%~20%) step by step and at each SOC, 10 s HPPC tests are repeated as described above. The HPPC tests at −10° C. uses basically the same protocol as testing at 25° C., except that the 10 s discharge pulse is performed at 2 C rate and the 10 s charge pulse is performed at 1 C rate. To avoid the influence of self-heating of the cell on the cell temperature during charge and discharge, a fixed relaxation time is applied after each charge and discharge step. The HPPC tests are conducted on two cells of each cathode material at each temperature and the DCR results are averaged for the two cells and plotted against the SOC. Basically, a lower DCR corresponds to a higher power performance.

The invention is further illustrated in the following examples:

Preparation of Examples: Influence of Parameters

An NMC precursor is typically prepared by combining a metal salt solution and a base in a stirred reactor. The pH is influenced by the ratio of the base used per metal ion (OH/Me) during the precipitation. The stoichiometric ratio of sodium hydroxide to metal(II) is 2. If the ratio is lower than 2 the pH decreases. Sometimes ammonia is added and this will also affect the pH. As said before, during the operation the particle size can be adapted by eg. selecting a certain value for the pH, the residence time and the energy input in the reactor (=the power×time). The number of rotations per minute (rpm) of the impeller and the impeller size are responsible for the power delivered to the liquid medium. The power can be calculated or measured from the power delivered by the engine frequency drive (of the impeller motor).

When during the precipitation the pH is lowered, a higher sulfur content and a higher BET is reached. A low residence time avoids the precipitation of dense crystals and can also lead to a less dense arrangement of crystals inside the particles. Some of the sulfur is present inside the crystals that make up the particles, and some of the sulfur is absorbed on the particles' surface. The sulfur present in the crystals is difficult to remove by washing. The sulfur absorbed on the surface can be washed away depending on the accessibility of the sulfur by the washing media. This accessibility is determined by both the arrangement of the crystals and the BET. Therefore it is required to make a compromise between pH, residence time and power to reach the desired BET and sulfur content. There are multiple combinations possible to prepare the desired product. For some of the Examples and Counter Examples of the invention (that are discussed further below), the precipitation parameters in a CFR reactor volume of 7 L are given below. In the process sodium hydroxide but no ammonia was used.

TABLE 1 influence of residence time

| | | rpm | Residence time (min) | OH/Me | Temperature (° C.) | Power (W/kg) | BET | S |
|---|---|---|---|---|---|---|---|---|
| EX9 | Example | 1200 | 34 | 1.96 | 150 | 15.0 | 20.8 | 0.150 |
| EX20 | Counter-Example | 1200 | 20 | 1.96 | 150 | 15.0 | 20.3 | 0.520 |

In the case of EX20 versus EX9 the lower residence time at the same power (expressed by the rpm) and pH (expressed by the ratio OH/Me) gives a similar BET. Note that the third digit in the determination of the BET is not significant. The longer residence time in EX9 does not have a too big impact on the BET but due to the longer residence time S is not incorporated in the crystals. The crystals have more time to arrange the atoms into their structure and expel the sulfur, that is washed away consecutively.

TABLE 2 influence of pH

| | | rpm | Residence time (min) | OH/Me | Temperature (° C.) | Power (W/kg) | BET | S |
|---|---|---|---|---|---|---|---|---|
| EX10 | Example | 1200 | 20 | 1.97 | 149 | 15.0 | 23.2 | 0.300 |
| EX22 | Counter-Example | 1200 | 19 | 1.92 | 149 | 15.0 | 35.6 | 0.470 |

The OH/Me should be carefully tuned because small variations can have a big impact on the pH and eventually the particle size and other particle characteristics such as BET. The pH has also an impact on the sulfur content. In Example 10 a compromise was made to have a high enough BET but a lower sulfur content.

TABLE 3 influence of power input

| | Ex-Counter | rpm | Residence time (min) | OH/Me | Temperature (° C.) | Power (W/kg) | BET | S |
|---|---|---|---|---|---|---|---|---|
| EX11 | Example | 600 | 20 | 1.96 | 150 | 1.9 | 27.1 | 0.250 |
| EX20 | Counter-Example | 1200 | 20 | 1.96 | 150 | 15.0 | 20.3 | 0.520 |

Both Examples 11 and 20 were made at low residence times, but since the reactor can mix very fast even at low residence times, it can exercise an adequate power/kg of material. This is accomplished by using a loop setup where all material passes the pump impeller frequently. If too much power is applied the crystal arrangement inside the particles is more dense as loosely fit crystals or softer crystals are removed from the particle. The recorded BET is also lower. As both the BET is lower and the arrangement is denser the accessibility by the washing medium is lower and it is more difficult to remove the sulfur.

For a reactor volume of 7 L the power by the impeller needs to be typically higher than 1 W/kg, and can go up to even higher than 10 W/kg of product—a value that can be reached easily in a large scale CFR compared to a production scale CSTR. A mean residence time to make high BET particles is between 5-90 minutes.

Other examples can show the influence of the temperature in the reactor: at temperatures below 45° C. the morphology of the precipitated precursor is no longer spherical. Increasing the temperature above 200° C. will increase the pressure inside the reactor and make the operation too costly.

ANALYSIS OF VARIOUS EXAMPLES AND COUNTER EXAMPLES

Example 1~6

Examples 1~6 are made from 6 μm NMC433 precursor compounds with different BET and different sulfur content as shown in Table 4. Each precursor compound is blended with $Li_2CO_3$ in a Li:M molar ratio of 1.08 and fired at 930° C. for 10 hr in air. The sintered cake is then crushed and classified so as to obtain a non-agglomerated powder with a mean particle size D50 similar with that of the precursor. The precursor compounds in Examples 1~5 have $$\left(\frac{BET-25}{18-6x}\right)^2 + \left(\frac{S-0.15}{0.25-0.05x}\right)^2$$

smaller than unity (x=0.38) and the cathode materials made from these precursor compounds show a $Q_{irr}$ lower than 9%, which is preferred. On the contrary, the precursor compound in Example 6 has a value for $$\left(\frac{BET-25}{18-6x}\right)^2 + \left(\frac{S-0.15}{0.25-0.05x}\right)^2$$

that is larger than unity and the cathode material made from this precursor has a $Q_{irr}$ higher than 9%, which is not good. Conclusion: NMC433 precursor compounds with $$\left(\frac{BET-25}{18-6x}\right)^2 + \left(\frac{S-0.15}{0.25-0.05x}\right)^2 \leq 1$$

are desired.

Example 7~23

Examples 7~23 are about 6 μm NMC532 precursor compounds with different BET and different sulfur content as shown in Table 5. Each precursor compound is blended with Li$_2$CO$_3$ in a Li:M molar ratio of 1.02 and fired at 920° C. for 10 hr in air. The sintered cake is then crushed and classified so as to obtain a non-agglomerated powder with a mean particle size D50 similar with that of the precursor. The precursor compounds in Examples 7~12 have $$\left(\frac{BET-25}{18-6x}\right)^2 + \left(\frac{S-0.15}{0.25-0.05x}\right)^2$$

smaller than unity (x=0.50) and the cathode materials made from these precursor compounds show a $Q_{irr}$ lower than 9%, which is preferred. On the contrary, precursor compounds in Examples 13~23 have $$\left(\frac{BET-25}{18-6x}\right)^2 + \left(\frac{S-0.15}{0.25-0.05x}\right)^2$$

larger than unity and the cathode materials made from these precursors have a $Q_{irr}$ higher than 9%, which is not good. In addition, it is found that the initial charge capacity decreases as the precursor sulfur content increases, as shown in FIG. 1. This is another reason that too high sulfur content is not desired. Conclusion: NMC532 precursor compounds satisfying $$\left(\frac{BET-25}{18-6x}\right)^2 + \left(\frac{S-0.15}{0.25-0.05x}\right)^2 \leq 1$$

are preferred.

Example 24~30

Figure 2:
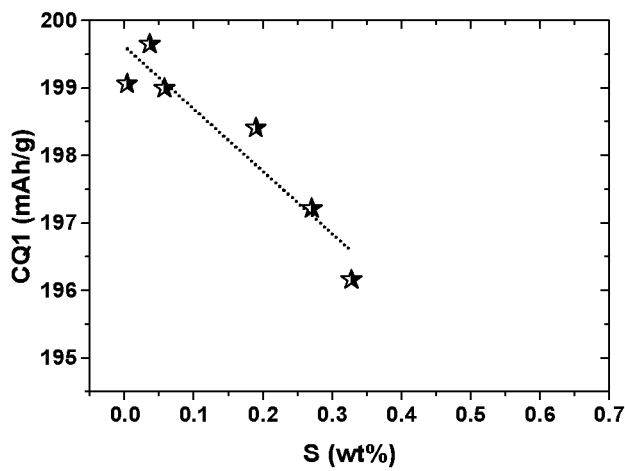
FIG. 2: the correlation between the initial charge capacity of NMC622 and the sulfur content of the corresponding precursor, where the dotted line is a linear interpretation.
Figure 3:
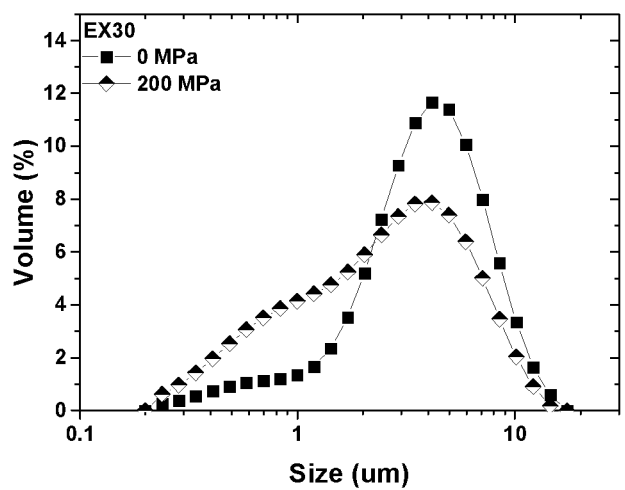
FIG. 3: particle size distribution curve of cathode material in EX30 with and without being pressed by uniaxial stress.

Examples 24~30 are about 4 μm NMC622 precursor compounds with different BET and different sulfur content as shown in Table 6. Each precursor compound is blended with LiOH in a Li:M molar ratio of 1.02 and fired at 860° C. for 10 hr in air. The sintered cake is then crushed and classified so as to obtain a non-agglomerated powder with a mean particle size D50 similar with that of the precursor. The precursor compounds in Examples 24~27 have $$\left(\frac{BET-25}{18-6x}\right)^2 + \left(\frac{S-0.15}{0.25-0.05x}\right)^2$$

smaller than unity (x=0.60) and the cathode materials made from these precursor compounds show a $Q_{irr}$ lower than 9%, which is preferred. On the contrary, precursor compounds in Examples 28~29 have $$\left(\frac{BET-25}{18-6x}\right)^2 + \left(\frac{S-0.15}{0.25-0.05x}\right)^2$$

larger than unity and the cathode materials made from these precursors have a $Q_{irr}$ higher than 9%, which is not good. Furthermore, it is confirmed again that CQ1 decreases with increasing precursor sulfur content, as shown in FIG. 2. In Ex30, the precursor compound has a BET higher than 50 m$^2$/g, which gives a very brittle cathode material at the end. The cathode material—after milling and classifying—contains already a big amount of fine particles as shown in FIG. 3. Being pressed in a stainless-steel die under a pressure of 200 MPa, which is similar to the pressure applied during cathode electrode rolling, the particles break severely, creating much more fine particles, and most probably a lot of cracks in particles as well. So a precursor with very high BET should be avoided. Conclusion: NMC532 precursor compounds satisfying $$\left(\frac{BET-25}{18-6x}\right)^2 + \left(\frac{S-0.15}{0.25-0.05x}\right)^2 \leq 1$$

are preferred.

Example 31~35

Different from all previous examples, which are about 4~6 μm precursors, Example 31~35 describe 10~12 μm NMC532 precursor compounds with different BET and sulfur content (see Table 7). Each precursor compound is blended with Li$_2$CO$_3$ in a Li:M molar ratio of 1.02 and fired at 920° C. for 10 hr in air. The sintered cake is then crushed and classified so as to obtain a non-agglomerated powder with a mean particle size D50 similar with that of the precursor. The precursor compounds in Examples 31~32 have $$\left(\frac{BET-25}{18-6x}\right)^2 + \left(\frac{S-0.15}{0.25-0.05x}\right)^2$$

smaller than unity (x=0.50) and the cathode materials made from these precursor compounds show a $Q_{irr}$ lower than 10%, which is preferred for 10~12 μm big NMC532 cathode materials. On the contrary, precursor compounds in Examples 33~35 have $$\left(\frac{BET-25}{18-6x}\right)^2 + \left(\frac{S-0.15}{0.25-0.05x}\right)^2$$

larger than unity and the cathode materials made from these precursors have a $Q_{irr}$ higher than 11%, which is worse than those of example 31~32. Therefore, for big size precursor compounds, those satisfying $$\left(\frac{BET-25}{18-6x}\right)^2 + \left(\frac{S-0.15}{0.25-0.05x}\right)^2 \leq 1$$

are preferred.

The overview of all of the Examples learns that it is preferable to have a precursor that has a specific surface area with 12<BET<50 m$^2$/g to obtain the desired low values for $Q_{irr}$. It further learns that setting the criterion $$\left(\frac{BET-25}{18-6x}\right)^2 + \left(\frac{S-0.15}{0.25-0.05x}\right)^2 \leq 0.9$$

will result in even lower values for $Q_{irr}$. Furthermore, Examples 1 to 23 have shown that the criterion for the values of BET and S can be set at a more severe value to obtain the desired low $Q_{irr}$. Particularly, for these compositions with x≤0.50, $$\left(\frac{BET-25}{18-6x}\right)^2+\left(\frac{S-0.15}{0.25-0.05x}\right)^2 \le 0.75$$

is a preferred criterion.

Figure 4:
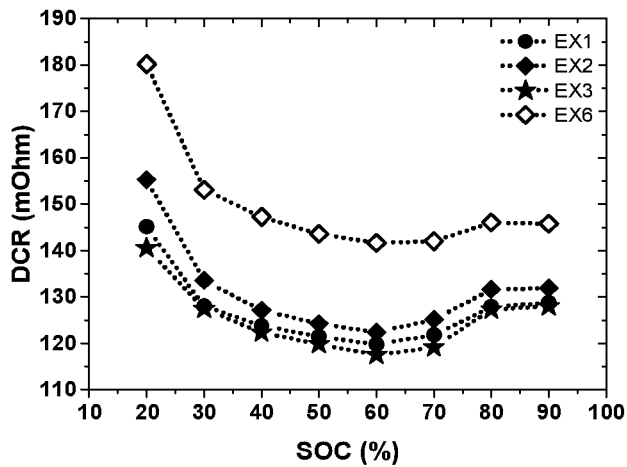
FIG. 4: Direct current resistance (DCR) measured by hybrid pulse power characterization at 25° C. at different state of charge (SOC) for NMC433 cathode materials (Ex. 1, 2, 3 and 6)
Figure 5:
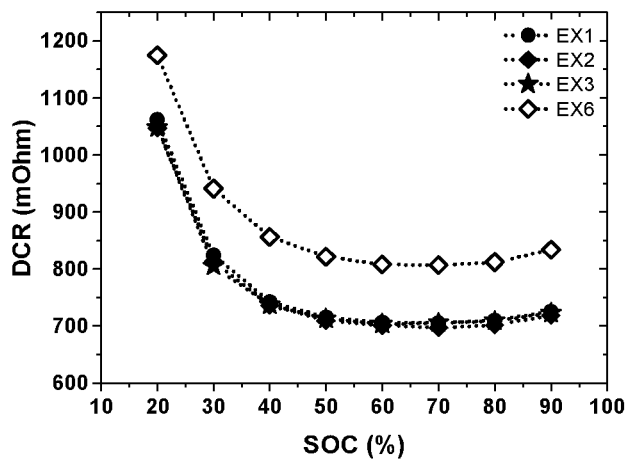
FIG. 5: Direct current resistance (DCR) measured by hybrid pulse power characterization at −10° C. at different state of charge (SOC) for NMC433 cathode materials (Ex. 1, 2, 3 and 6)
Figure 6:
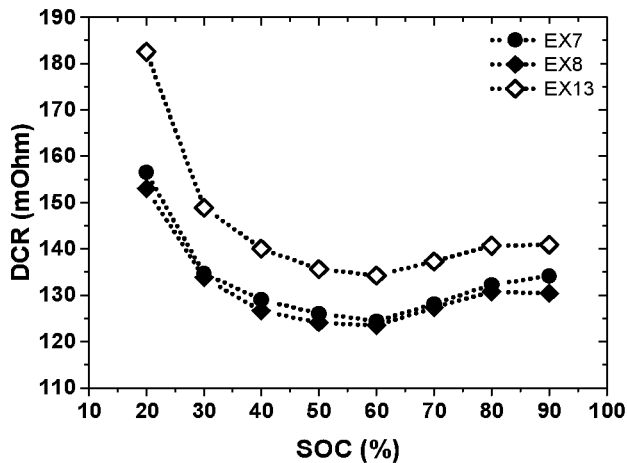
FIG. 6: Direct current resistance (DCR) measured by hybrid pulse power characterization at 25° C. at different state of charge (SOC) for NMC532 cathode materials (Ex. 7, 8 and 13)
Figure 7:
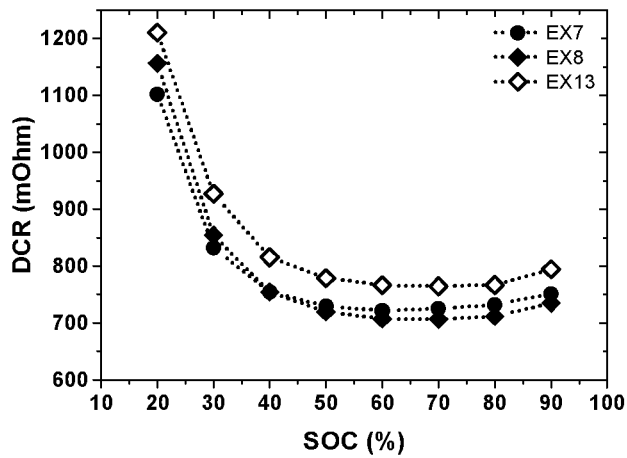
FIG. 7: Direct current resistance (DCR) measured by hybrid pulse power characterization at −10° C. at different state of charge (SOC) for NMC532 cathode materials (Ex. 7, 8 and 13)
Figure 8:
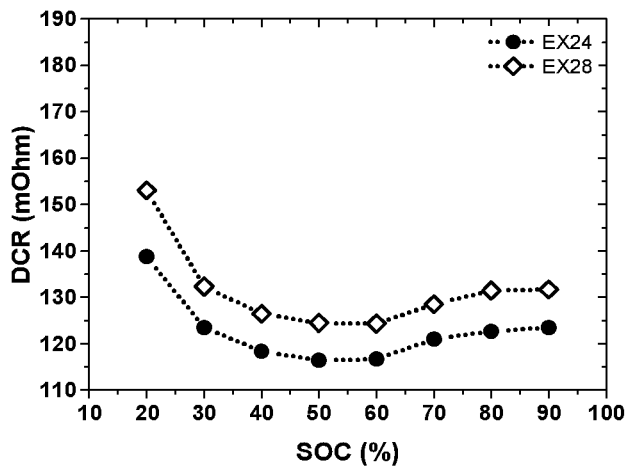
FIG. 8: Direct current resistance (DCR) measured by hybrid pulse power characterization at 25° C. at different state of charge (SOC) for NMC622 cathode materials (Ex. 24 and 28)
Figure 9:
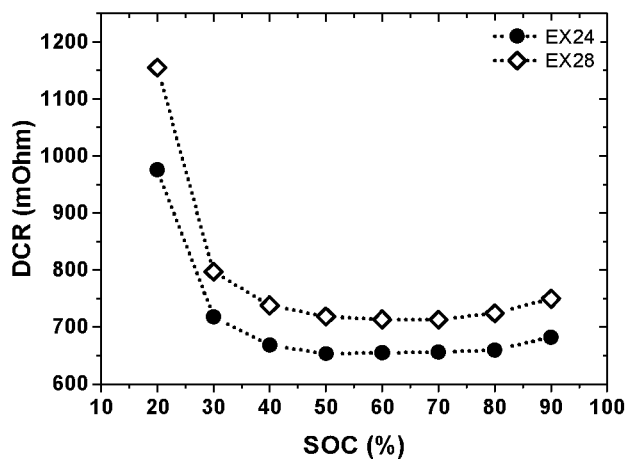
FIG. 9: Direct current resistance (DCR) measured by hybrid pulse power characterization at −10° C. at different state of charge (SOC) for NMC622 cathode materials (Ex. 24 and 28)

Within each NMC composition, some pouch type fullcells are prepared for DCR evaluation by using selected cathode materials (i) Ex. 1, 2, 3 and 6 from NMC433, (ii) Ex. 7, 8 and 13 from NMC532 and (iii) Ex. 24 and 28 from NMC622. The DCR tests are performed at representative temperatures of 25° C. and −10° C. within SOC range from 20 to 90%. FIGS. 4, 6 and 8 illustrate the 25° C. DCR performance of these selected NMC433, NMC532 and NMC622 cathode materials, respectively. FIGS. 5, 7 and 9 show the −10° C. DCR performance of NMC433, NMC532 and NMC622 cathode materials, respectively. All figures demonstrate that cathode materials from precursor compounds which satisfy $$\left(\frac{BET-25}{18-6x}\right)^2+\left(\frac{S-0.15}{0.25-0.05x}\right)^2 \le 1,$$

have relatively lower DCR than cathode materials from precursor compounds not satisfying the inequality, hence better power performance. This holds true for different NMC compositions, tested at different temperatures and at different SOC'S. Therefore, precursor compound with $$\left(\frac{BET-25}{18-6x}\right)^2+\left(\frac{S-0.15}{0.25-0.05x}\right)^2 \le 1$$

is desired for power application.

TABLE 4

6 µm NMC433 precursor compounds property, firing conditions and coin cell properties

| Examples | Precursor Ni/Mn/Co | BET (m²/g) | S (wt %) | Lithium source | Blend ratio | Firing T/° C. | $\left(\frac{BET-25}{18-6*x}\right)^2+\left(\frac{S-0.15}{0.25-0.05*x}\right)^2$ | $Q_{irr}$ |
|---|---|---|---|---|---|---|---|---|
| EX1 | 38/29/33 | 15.5 | 0.000 | Li₂CO₃ | 1.08 | 930 | <1 | 7.9 |
| EX2 | 38/29/33 | 22.0 | 0.310 | Li₂CO₃ | 1.08 | 930 | <1 | 6.6 |
| EX3 | 38/29/33 | 23.8 | 0.292 | Li₂CO₃ | 1.08 | 930 | <1 | 6.7 |
| EX4 | 38/29/33 | 19.8 | 0.299 | Li₂CO₃ | 1.08 | 930 | <1 | 7.1 |
| EX5 | 38/29/33 | 22.1 | 0.277 | Li₂CO₃ | 1.08 | 930 | <1 | 6.7 |
| EX6 | 38/29/33 | 8.3 | 0.072 | Li₂CO₃ | 1.08 | 930 | >1 | 9.6 |

Example 6 is a counterexample of the invention

TABLE 5

6 µm NMC532 precursor compounds property, firing conditions and coin cell irreversible capacity

| Examples | Precursor Ni/Mn/Co | BET (m²/g) | S (wt %) | Lithium source | Blend ratio | Firing T/° C. | $\left(\frac{BET-25}{18-6*x}\right)^2+\left(\frac{S-0.15}{0.25-0.05*x}\right)^2$ | CQ1 | $Q_{irr}$ |
|---|---|---|---|---|---|---|---|---|---|
| EX7 | 50/30/20 | 13.8 | 0.063 | Li₂CO₃ | 1.02 | 920 | <1 | 191.5 | 8.8 |
| EX8 | 50/30/20 | 16.0 | 0.065 | Li₂CO₃ | 1.02 | 920 | <1 | 191.5 | 8.6 |
| EX9 | 50/30/20 | 20.8 | 0.150 | Li₂CO₃ | 1.02 | 920 | <1 | 190.0 | 7.6 |
| EX10 | 50/30/20 | 23.2 | 0.300 | Li₂CO₃ | 1.02 | 920 | <1 | 189.3 | 7.8 |
| EX11 | 50/30/20 | 27.1 | 0.250 | Li₂CO₃ | 1.02 | 920 | <1 | 189.9 | 7.9 |
| EX12 | 50/30/20 | 27.5 | 0.176 | Li₂CO₃ | 1.02 | 920 | <1 | 189.8 | 7.6 |
| EX13 | 50/30/20 | 10.2 | 0.112 | Li₂CO₃ | 1.02 | 920 | >1 | 191.4 | 10.7 |
| EX14 | 50/30/20 | 3.7 | 0.057 | Li₂CO₃ | 1.02 | 920 | >1 | 189.9 | 12.3 |
| EX15 | 50/30/20 | 5.5 | 0.077 | Li₂CO₃ | 1.02 | 920 | >1 | 190.5 | 10.1 |
| EX16 | 50/30/20 | 7.6 | 0.201 | Li₂CO₃ | 1.02 | 920 | >1 | 189.3 | 9.6 |
| EX17 | 50/30/20 | 9.8 | 0.048 | Li₂CO₃ | 1.02 | 920 | >1 | 190.0 | 13.1 |
| EX18 | 50/30/20 | 11.1 | 0.065 | Li₂CO₃ | 1.02 | 920 | >1 | 190.9 | 10.6 |
| EX19 | 50/30/20 | 19.0 | 0.450 | Li₂CO₃ | 1.02 | 920 | >1 | 188.8 | 9.1 |
| EX20 | 50/30/20 | 20.3 | 0.520 | Li₂CO₃ | 1.02 | 920 | >1 | 188.6 | 11.2 |
| EX21 | 50/30/20 | 22.1 | 0.650 | Li₂CO₃ | 1.02 | 920 | >1 | 187.2 | 13.7 |
| EX22 | 50/30/20 | 35.6 | 0.470 | Li₂CO₃ | 1.02 | 920 | >1 | 188.6 | 12.4 |
| EX23 | 50/30/20 | 50.5 | 0.460 | Li₂CO₃ | 1.02 | 920 | >1 | 188.7 | 11.9 |

Examples 13-23 are counterexamples of the invention

TABLE 6

4 µm NMC622 precursor compounds property, firing conditions and coin cell irreversible capacity

| Examples | Precursor Ni/Mn/Co | BET (m²/g) | S (wt %) | Lithium source | Blend ratio | Firing T/° C. | $\left(\frac{BET-25}{18-6*x}\right)^2+\left(\frac{S-0.15}{0.25-0.05*x}\right)^2$ | CQ1 | $Q_{irr}$ |
|---|---|---|---|---|---|---|---|---|---|
| EX24 | 60/20/20 | 37.0 | 0.190 | LiOH | 1.02 | 860 | <1 | 198.4 | 7.1 |
| EX25 | 60/20/20 | 18.1 | 0.328 | LiOH | 1.02 | 860 | <1 | 196.2 | 7.9 |
| EX26 | 60/20/20 | 18.9 | 0.037 | LiOH | 1.02 | 860 | <1 | 199.7 | 6.9 |

TABLE 6-continued

4 μm NMC622 precursor compounds property, firing conditions and coin cell irreversible capacity

| Examples | Precursor Ni/Mn/Co | BET (m²/g) | S (wt %) | Lithium source | Blend ratio | Firing T/° C. | $\left(\frac{BET-25}{18-6*x}\right)^2 + \left(\frac{S-0.15}{0.25-0.05*x}\right)^2$ | CQ1 | $Q_{irr}$ |
|---|---|---|---|---|---|---|---|---|---|
| Ex27 | 60/20/20 | 21.2 | 0.271 | LiOH | 1.02 | 860 | <1 | 197.2 | 7.4 |
| EX28 | 60/20/20 | 7.4 | 0.058 | LiOH | 1.02 | 860 | >1 | 199.0 | 9.5 |
| EX29 | 60/20/20 | 4.8 | 0.004 | LiOH | 1.02 | 860 | >1 | 199.1 | 10.6 |
| EX30 | 60/20/20 | 50.7 | 0.116 | LiOH | 1.02 | 860 | >1 | / | / |

Examples 28-30 are counterexamples of the invention

TABLE 7

10~12 μm NMC532 precursor compounds property, firing conditions and coin cell irreversible capacity

| Examples | Precursor Ni/Mn/Co | BET (m²/g) | S (wt %) | Lithium source | Blend ratio | Firing T/° C. | $\left(\frac{BET-25}{18-6*x}\right)^2 + \left(\frac{S-0.15}{0.25-0.05*x}\right)^2$ | $Q_{irr}$ |
|---|---|---|---|---|---|---|---|---|
| Ex31 | 50/30/20 | 13.5 | 0.064 | Li₂CO₃ | 1.02 | 920 | <1 | 9.7 |
| EX32 | 50/30/20 | 26.1 | 0.194 | Li₂CO₃ | 1.02 | 920 | <1 | 9.6 |
| EX33 | 50/30/20 | 4.1 | 0.113 | Li₂CO₃ | 1.02 | 920 | >1 | 11.9 |
| EX34 | 50/30/20 | 4.4 | 0.146 | Li₂CO₃ | 1.02 | 920 | >1 | 12.1 |
| EX35 | 50/30/20 | 4.5 | 0.119 | Li₂CO₃ | 1.02 | 920 | >1 | 11.6 |

Examples 33-35 are counterexamples of the invention

The invention claimed is:

1. A particulate precursor compound for manufacturing a lithium transition metal (M)-oxide powder for use as an active positive electrode material in lithium-ion batteries, wherein (M) is $Ni_xMn_yCo_zA_v$, A being a dopant, and wherein
0.33≤x≤0.50, 0.20≤y≤0.33, and 0.20≤z≤0.33, v≤0.05, and x+y+z+v=1, and the precursor comprises Ni, Mn and Co in a molar ratio x:y:z and has a specific surface area BET in m²/g and a sulfur content S expressed in wt %, and $$\left(\frac{BET-25}{18-6x}\right)^2 + \left(\frac{S-0.15}{0.25-0.05x}\right)^2 \leq 0.75.$$

2. The particulate precursor compound of claim 1, wherein the precursor comprises a hydroxide M-OH or an oxyhydroxide M-OOH compound.

3. A method for preparing a lithium transition metal (M)-oxide powder for use as an active positive electrode material in lithium-ion batteries, comprising:

providing the M-precursor according to claim 1, providing a Li precursor compound, mixing the M-precursor and the Li precursor, and firing the mixture at a temperature between 600 and 1100° C. for at least 1 hr.

* * * * *